Y2587 OR 4,020,326

United States Patent [19]

Coulthurst

[11] 4,020,326

[45] Apr. 26, 1977

[54] TOKEN-CONTROL

[75] Inventor: Ian James Coulthurst, Maidenhead, England

[73] Assignee: Chubb Integrated Systems Limited, London, England

[22] Filed: Jan. 20, 1975

[21] Appl. No.: 542,624

[30] Foreign Application Priority Data

Jan. 21, 1974 United Kingdom ............ 02699/74

[52] U.S. Cl. .................... 235/61.7 B; 235/61.11 D

[51] Int. Cl.[2] ........................ G06F 7/04; G06K 5/00

[58] Field of Search ................ 235/61.7 B, 61.11 D

[56] References Cited

UNITED STATES PATENTS

| | | | |
|---|---|---|---|
| 3,657,702 | 4/1972 | Stephenson, Jr. | 235/61.7 B |
| 3,731,076 | 5/1973 | Nagata et al. | 235/61.7 B |
| 3,743,134 | 7/1973 | Constable et al. | 235/61.11 D |

*Primary Examiner*—Vincent P. Canney
*Attorney, Agent, or Firm*—Pollock, VandeSande & Priddy

[57] ABSTRACT

A money-dispensing system is operative to dispense packets of money in selected number to a bank customer in response to presentation to the system of his credit card and keyed-entry of a personal identification number corresponding uniquely to the account number recorded magnetically on the card. Magnetic heads read from the card recordings defining the maximum number N of packets that can be withdrawn in any period of D days, the date of card expiry, and, as of the last use of the card, the date of commencement of the next period of D days and the extent to which the limit N has not been reached. If the date of commencement of the next period, which date is recorded as the number of days to the end of the expiry year, is after the current date, the transaction proceeds with up-dating of the extent of use recording accordingly, provided the limit N is not exceeded. If the date of next-period commencement is the same or before the current date the full limit N is made available for use and the recording of the next-period commencement is up-dated on the card to D days later than the current date.

18 Claims, 6 Drawing Figures

TOKEN-CONTROL

This invention relates to token control.

The invention relates to methods of token control but more especially to equipment in which operation in response to a token, such as a credit card, presented to the equipment is conditioned by information which is read from a recording borne by the token. More particularly the invention concerns such equipment of the specific kind in which the recorded information relates to the extent of previous use of the token within one of a succession of periods of time throughout each of which the token is authorized for limited use, and in which the record of the information is up-dated on the token by the equipment in dependence upon the operation performed by the equipment and the result of comparison between time-identifying data read from the token-recording and reference signals generated for the purpose of defining within the equipment a current epoch in Goldman time.

Equipment of this specific kind is disclosed in U.S. Pat. No. 3,610,889, issued Oct. 5, 1971 for use in the control of a customer's request for credit purchasing at a point of sale. The disclosed equipment receives the customer's credit card and reads from this two numbers that are recorded on the card magnetically. One of the two numbers defines the calendar month in which the card was last used, and the other number the total amount of credit already received or used in that month. The month-identifying number read from the card is compared with a number which indicates the current month-period and which is set into the equipment by the sales attendant. The sales attendant also sets into the equipment the value of the credit required in the requested transaction and the authorized monthly-limit of credit indicated on the customer's card.

If the result of the comparison involving the month-identifying number read from the card in the earlier-disclosed equipment, is such as to indicate that the last use of the card was earlier than the current credit-month, approval of the transaction will be signified to the sales attendant provided only that the credit required is within the credit-limit authorized. The month-identifying and credit-used numbers recorded on the card are then up-dated to indicate the use in the current-month and the value of the one transaction so far made in the month.

On the other hand, if the result of the comparison is such as to indicate that the credit card has already been used in the current month there is no charge made in the month-identifying number recorded on the card. Also, approval for the transaction is given only it the total sum of the credit value required for the requested transaction and the value indicated by the credit-used number read from the card, does not exceed the credit limit. If the total is within the limit and approval is consequently given, the recording of the number indicating the credit already used is appropriately up-dated on the card.

An indication that the transaction is not to proceed is given to the sales attendant by the equipment, and no updating takes place, whenever the credit limit for the current month would otherwise be exceeded. The transaction is similarly inhibited and warning is given if as a result of some tampering with the recording on the card, the month-identifying number read out is indicative of a later month than the current-month number set into the equipment by the sales attendant. With this earlier-proposed equipment the month-identifying number recorded on the card defines the last use of the card and clearly the identification of a later month cannot occur in legitimate operation of the equipment.

According to one aspect of the present invention there is provided equipment of the said specific kind wherein the time-identifying data recorded on the token defines the commencement of the authorized-use period which is next to commence following the last use of the token, and the equipment includes means for up-dating the record of this data on the token when the result of said comparison signifies that the next period-commencement is not later than the current time identified by the reference signals.

Thus with this equipment of the present invention it is only when the new period indicated by the time-identifying data has been entered, that is to say has already begun, that up-dating of that data takes place. In contrast to the earlier-disclosed equipment referred to above, where the time-identifying data recorded on the token relates to the last use of the token, such data relates in the equipment of the present invention to the next following period of authorized-use.

The use of time-identifying data defining the next authorized-use period rather than the present period, facilitates greater flexibility in allocation of creditor other use- authorization from one user to another. It also enables the individual user to be given a greater degree of freedom in the use of the authorized credit, outside a rigid month-by-month or other fixed period-by-period sequence applicable to all users. For example, it is readily possible for the allocation of authorized-used to be in terms of a maximum, permissible rate or frequency of use that is expressed as a number N of uses (for example of money-or other value-significance) in a number D days, and for the combinations of values of the numbers N and D to differ from token to token. In these circumstances the time-identifying data recorded on the token when the token is first used would define commencement of the next, second, authorized-use period as a date D days later. The recording of this date would remain unchanged until the first use on or after this date, that is to say in the second period, whereupon the recording would be up-dated to define the commencement of the next, third, period of D days. The up-dating may be related directly from the date of this first use in the second period, rather than from the end of the first period, so that the full period of D days is afforded for exercise of the allocated permissible rate or frequency of use. The successive periods of authorized-use may similarly proceed in turn related to use made of the individual token rather than to any generally-applied and predetermined month-by-month, or similar, period-sequence.

Information defining the rate or frequency of authorized use of the token may be recorded on the token for reading by the equipment. More especially, in the example given above, the token may bear a recording of data that identifies the values of the numbers N and D applicable to the token, for use by the equipment when up-dating the token-recordings of the time-identifying data and the information concerning the extent of previous use.

The date of expiry of the token may be recorded on the token for reading by the equipment and in these circumstances the date of commencement of the next authorized-use period may be recorded on the token as the number of days from this latter date to expiry, or at least to the end of the year of expiry. The method of representing the commencement of the next authorized-use period in this way is of advantage in relation to security, especially where tokens are issued for one year only. More particularly any fraudulent attempt to prolong the life of the token by modification of the year of expiry recorded on the token will in general have the effect of inhibiting use of the token for the interval by which the expiry date has been changed. Any attempt on the other hand to secure early commencement of a new authorized-use period by advancing the recorded expiry date will in general be fruitless in that it will lead to retention of the card as having expired.

The equipment of the present invention may be used for credit control at a point of sale, but is applicable to control of access to any form of facility, for example, entry to a restricted area, use of a service, or release of means enabling withdrawal of an item or product (in predetermined or selected quantity). In the latter context equipment according to the invention may form part of an item-dispensing system, in which the equipment is used to regulate release of a dispenser. One particular application of such a system is in the field of banking where a money-dispensing system is to be provided for use by customers at all times, the customers being issued with individual tokens for presentation to the system when withdrawal of money is required. The equipment of the present invention in this latter connection may be arranged to regulate operation of the money-dispenser so that money (for example, in bank-note form) is dispensed to the customer in response to each valid 'request' for withdrawal.

According to another aspect of the present invention there is provided a method of token control in which performance of an operation in response to presentation of a token is conditioned by information which is read from a recording borne by the token, the recorded information relating to the extent of previous use of the token within one of a succession of periods of time throughout each of which the token is authorized for limited use, and in which the recorded information is up-dated on the token in dependence upon the operation performed and the result of comparison between a date read from the token-recording and the current date, wherein the date recorded on the token is taken to define the commencement of the authorized-use period which is next to commence following the last use of the token, and the record of this date is up-dated on the token when the result of said comparison signifies that the next period-commencement is not later than the current date.

A money-dispensing system including equipment in accordance with the present invention, together with a method of operation thereof in accordance with the invention, will now be described, by way of example, with reference to the accompanying drawings, in which.

Figure 1:
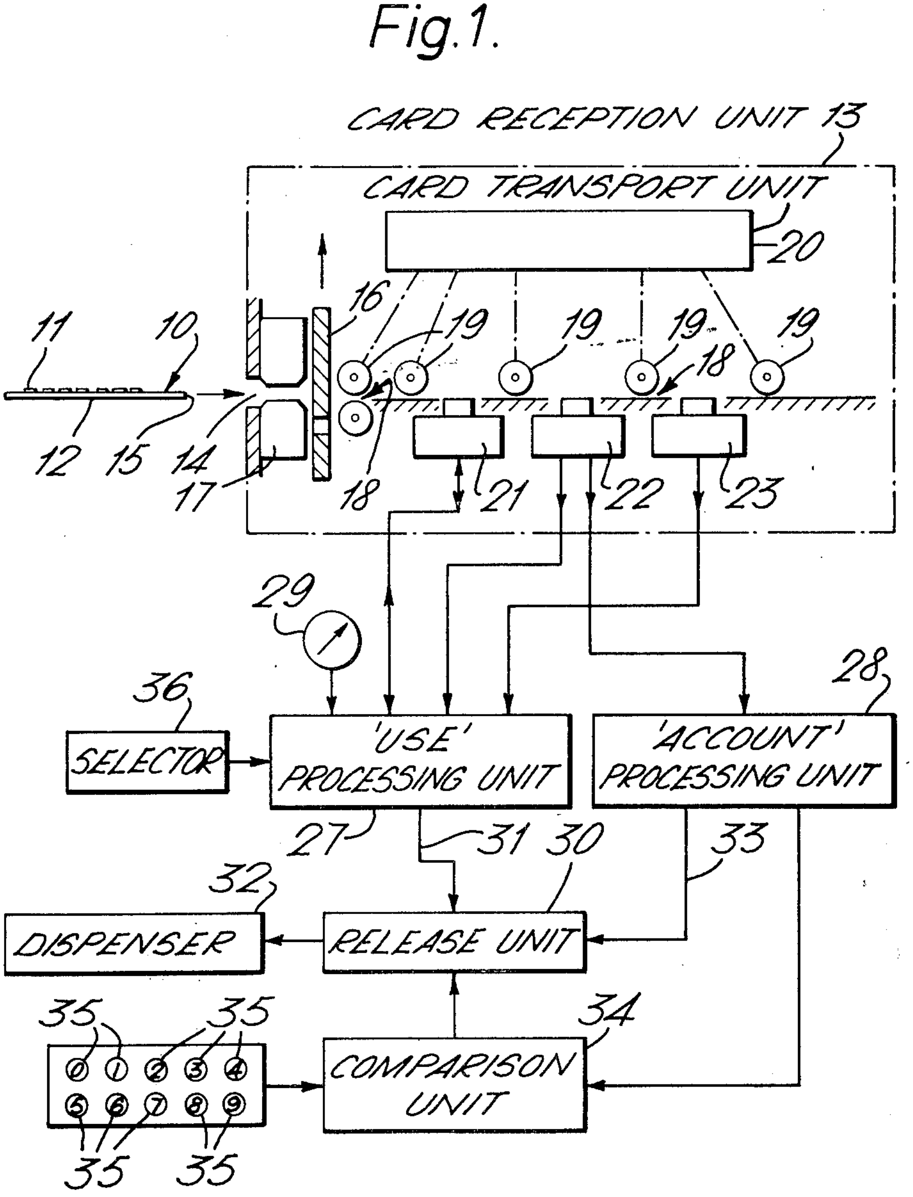
FIG. 1 is a schematic representation of the money-dispensing system.
Figure 2:
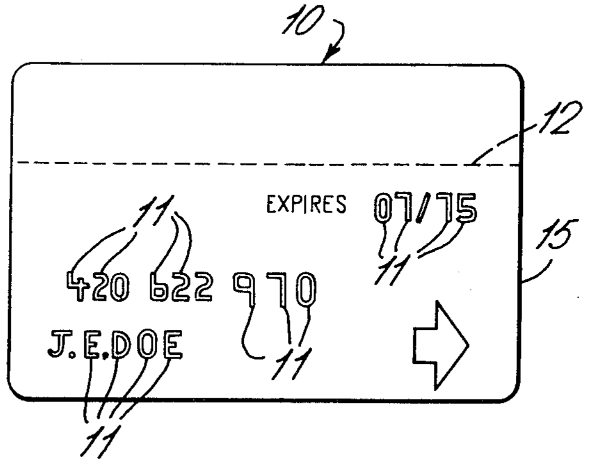
FIGS. 2 and 3 illustrate the top and underside respectively of a credit card used with the system of FIG. 1.
Figure 3:
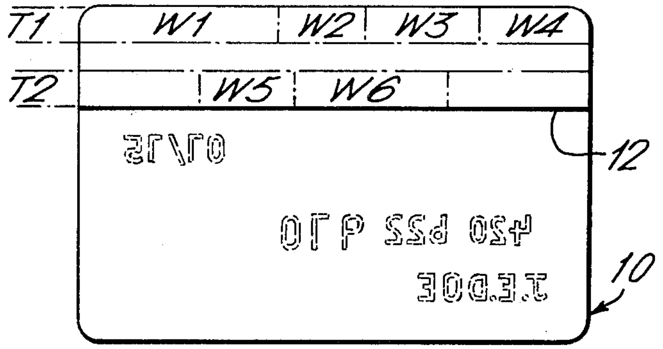

The money-dispensing system represented in FIG. 1 is operable to dispense packets of bank notes to authorized customers of a bank after, as well as during, normal banking hours. The customers authorized to use the system are each issued with a coded token in the form of a rectangular plastics card 10 that may be used generally as a credit card. Each card 10, as shown in FIGS. 2 and 3, bears the date of expiry and numerical information identifying the account of the customer to whom the card has been issued. This information, as well as being embossed directly on the card in alphanumeric characters 11, is recorded magnetically in a strip 12 of a ferromagnetic oxide. The strip 12 is inset in the underside of the card 10 to extend lengthwise of the card along one edge.

Each customer is informed of a secret, personal identification number that is individual to his account but cannot be deduced from the card 10 itself, and of a maximum, permissible rate or frequency of use of the card to withdraw packets of bank-notes. The frequency-of-use limit is specified as a particular maximum number N of packets in a certain period of D days; for example, the maximum frequency of withdrawal may be five packets in any period of seven days.

When the customer wishes to withdraw a packet of bank-notes he presents his card 10 to a card-reception unit 13 of the system. The unit 13 has a facia that is mounted in an external wall of the bank to be accessible from outside and to provide an entrance 14 for the card 10. The card 10 is inserted in the entrance 14 lengthwise with the embossings 11 uppermost and with the leading end 15 just within the unit 13. Entry of the card 10 further is blocked by an apertured shutter 16 until the existence of the strip 12, with appropriate offset to one side in the entrance 14, is detected by an electromagnetic detector 17. Detection of the appropriately-located strip 12 causes the shutter 16 to be lifted to admit the card 10 fully to the unit 13 through the entrance 14.

The card 10 admitted fully to the unit 13 is drawn lengthwise along a guideway 18 by rollers 19 that are driven by a card-transport unit 20. In its passage along the guideway 18 the card 10 passes successively across a reading-recording head unit 21 and two reading-head units 22 and 23. The head units 21 and 23, although spaced longitudinally of the guideway 18 from one another, are both located in a position across the guideway 18 to read from the card 10 information recorded magnetically in a longitudinal track T1 of the strip 12. The head unit 22 on the other hand, is located at a position to read recorded information from a parallel track T2. The tracks T1 and T2 together with certain data recorded magnetically in them, are indicated diagrammatically in the representation of the strip 12 in FIG. 3.

Four words W1 to W4 are recorded in track T1 on the card 10 using the technique described in Constable et al. U.S. Pat. No. 3,743,134 issued July 3, 1973. In this technique the recording is made using two magnetic heads that are positioned very closely side-by-side across the track width with their conventionally-straight gaps obliquely oriented to the track length and also to one another, in a V-shaped, or chevron, configuration. Only half of the full track width is covered by the gap of each head, and binary-encoded data is recorded using a carrier oscillation having a frequency of, for example, 4 kHz., that is applied to the two heads with a relative phasing that is switched to in-phase or anti-phase according to the binary value to be recorded. The phase-modulated and angled recordings consequently made in the two halves of the track width can be read out intelligibly only if a pair of closely-positioned reading heads with the same relative gap-orientation or chevron angle, are used.

The word W4 is recorded in track T1 using a pair of heads that have a different chevron angle from the pair of angled heads used to record the words W1 to W3.

Figure 4:
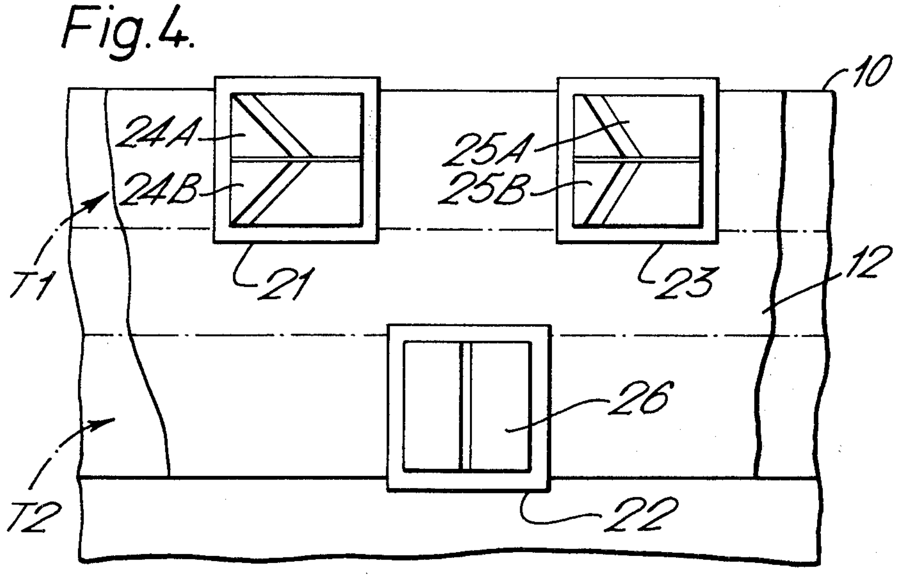
FIG. 4 is an enlarged view of a part of the card of FIGS. 2 and 3 illustrating the magnetic recording tracks embodied in the card and the relative orientation of magnetic recording heads used to read and record information in these tracks.

The task of the head unit 21 is to read, and subsequently to make recordings of, the words W1 to W3. As illustrated in FIG. 4, the unit 21 includes two angled-gap heads 24A and 24B providing the appropriate chevron angle for the task. The head unit 23, on the other hand, serves to read the word W4 only, and the unit 23 accordingly includes two angled heads 25A and 25B having the different chevron angle required in respect of the word W4.

Both units 21 and 23 include an electrical circuit or other means for checking that the signals that are derived by its respective pair of heads 24A, 24B or 25A, 25B are in-phase or anti-phase and also have nominally equal magnitudes that lie above a predetermined threshold level. The check is satisfied and a read out of data is made only if the recording sensed by the head pair was made using a correspondingly-angled pair of heads with the appropriate phase-modulation method. Provided constructional details concerning the pairs of heads 24A, 24B and 25A, 25B (in particular of the chevron angles used) are maintained secret, it is possible to regard all the information recorded in track T1 as secure. Such information may also be regarded to be immune to an acceptable degree from attempts to modify it fraudulently.

Two words W5 and W6 are recorded in track T2 using a conventional recording head, and in this respect cannot be regarded as secure and immune from fraudulent modification. The unit 22 as illustrated in FIG. 4, includes a normal straight-gap reading head 26 at right angles to the track length, for deriving a read out of the words W5 and W6 in the conventional manner. The words W5 and W6 represent respectively the expiry date, in month and year, and the customer's account number, as both embossed on the card 10 in the characters 11. Signals in accordance with the expiry date and account number read from the card 10 by the unit 22 are supplied to a 'use' processing unit 27 and an 'account' processing unit 28 respectively. Signals representative of the words W1 to W3 and W4 read from track T1 are supplied from the units 21 and 23, to the 'use' processing unit 27. The units 27 and 28 function in accordance with the programs of FIGS. 5 and 6 respectively, to control the dispensing operation in accordance with the words W1 to W6.

The words W1 and W2 define, as at the date of the last use of the card and immediately following that use, the status of the card in relation to the frequency-of-use restriction. More particularly, the word W1 is indicative of the date following the last use, from which the next period of D days is to commence. The word W2, on the other hand, is indicative of the number of packets that immediately following the last use could still be requested without exceeding the frequency-of-use limit imposed on the customer. Both words W1 and W2 are recorded as binary counts of the numbers involved. The date of commencement of the next period of D days represented in the word W1, is however not recorded in conventional-calendar form, but rather as a count of the number of days from that date to the end of the year of expiry. The year of expiry applicable is defined by the word W5 read from track T2 by the head unit 22.

A device 29 that is set day-by-day either automatically or manually, supplies to the 'use' processing unit 27 signals in accordance with the current day's date. The unit 27, acting according to the program illustrated in FIG. 5, computes from these signals the number of days from the current date to the end of the year of expiry indicated by word W5 read from track T2. The result of the computation is compared in the unit 27 with the word W1. If the computed number of days is larger than the number represented by the word W1, then dispensing can go ahead only up to the number of packets available as indicated by the word W2. Assuming that the computed number is in fact larger than the number represented by the word W1 and that the word W2 signifies a number other than zero, then a signal indicative of this is supplied from the 'use' processing unit 27 to a release unit 30 via a lead 31. The release unit 30 controls operation of a dispenser 32 to dispense packets of money to the customer through a delivery slot (not shown) in the facia of the unit 13.

Figure 6:
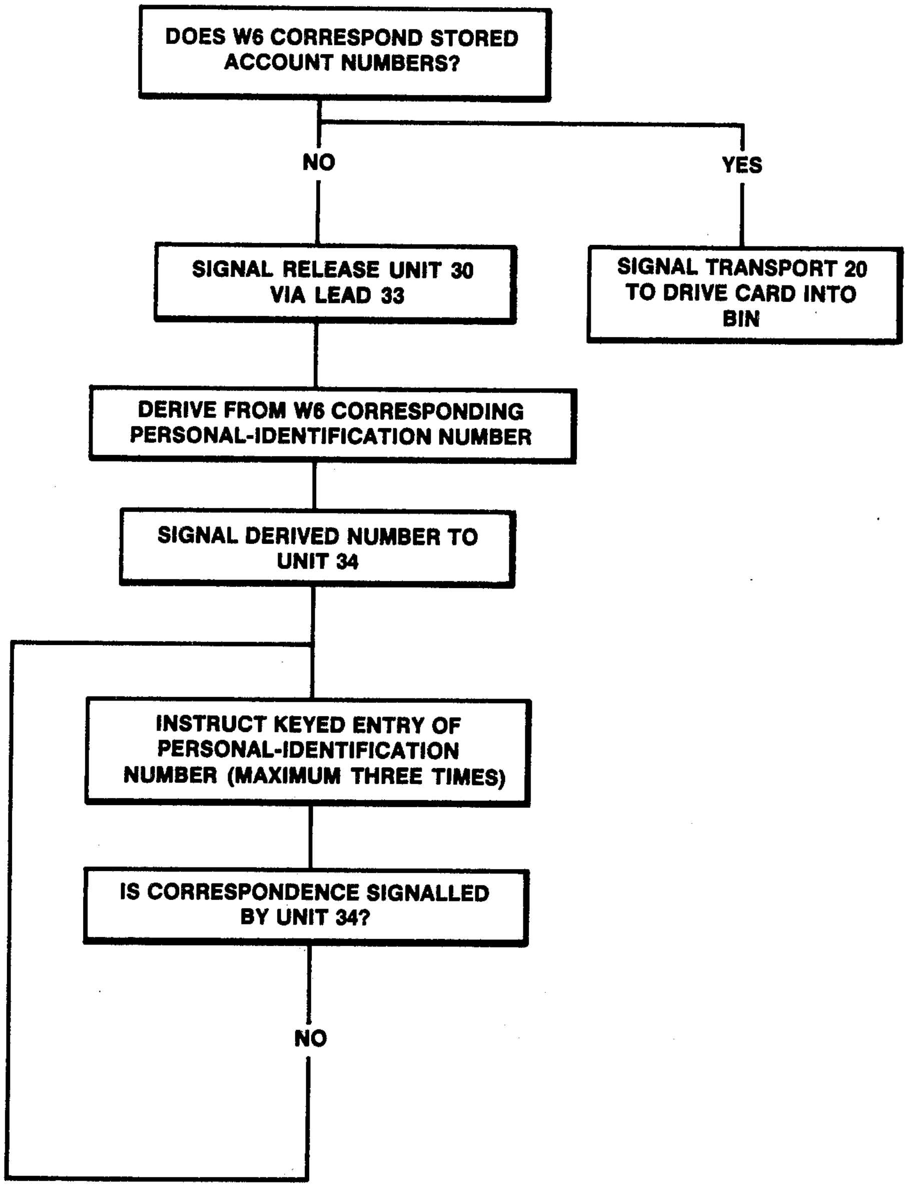

The 'account' processing unit 28 responds to the signals it receives in accordance with the word W6 read from track T2, and acting according to the program illustrated in FIG. 6, checks the customer's account number against the account numbers of customer's cards that are no longer valid by virtue of having been reported lost or stolen. A signal is supplied to the release unit 30 from the unit 28 via a lead 33 only if the account number is cleared in this check.

The account number is in addition used in the unit 28, as illustrated in FIG. 6, to derive the secret personal-identification number individual to the account. This may be derived from a memory that provides an index from all account numbers to their individually-paired personal-identification numbers, or alternatively may be derived from the account number using an algorithm or encyphering technique such as described in Constable U.S. Pat. No. 3,657,521, issued Apr. 11, 1972. In either case signals in accordance with the derived number are conveyed from the unit 28 to a comparison unit 34.

The customer is now instructed by illumination of a sign (not shown) on the facia of the unit 13 to enter his personal-identification number into the system. The number, for example of six digits, is entered using a set of ten push-buttons 35 mounted on the facia of the unit 13 and numbered 0 to 9. As the push-buttons 35 are operated one at a time to enter the digits sequentially, their values are conveyed to the comparison unit 34. In the unit 34 the manually-entered number is compared digit-by-digit with the number derived from the account number by the unit 28. If there is correspondence between the two numbers the unit 34 supplies a signal to this effect to the release unit 30 such that if appropriate signals are also present on the leads 31 and 33 (signifying that the checks as to the withdrawal-frequency and validity carried out in the units 27 and 28 are satisfied), the unit 30 then releases the dispenser 32 to dispense a packet of bank-notes to the customer through the delivery-slot in the facia of the unit 13.

More than one packet of bank-notes may be dispensed at any one time at the selection of the customer.

In this respect a selector 36 (for example in the form of a further set of push-buttons) is provided on the facia of the unit 13. Operation of the selector 36 by the customer to signify the sum of money he wishes to have dispensed, controls through the 'use' processing unit 27 the number of times the dispenser 32 is released by the unit 30 in the one operation of the equipment. The number of times the dispenser 32 is released in this way, and therefore the number of packets of bank-notes that can be dispensed in the one operation of the equipment, is nonetheless restricted by the unit 27 to lie within the limit represented by the word W2, in order that the prescribed maximum frequency-of-use shall not be exceeded.

Once dispensing has taken place the card transport unit 20 drives the rollers 19 to transport the card 10 back to the customer through the entrance 14. The heads 24A and 24B of the unit 21 are energized from the unit 27 during this to record the appropriate word W2 and also to re-record the word W1, both in the characteristic phase-modulated form, in track T1 of the strip 12 of the card 10. The word W2 recorded is a number equal to the number read out on entry of the card 10 as reduced by the number of packets of bank-notes that have been dispensed in the transaction.

The unit 30 does not release the dispenser 32, and no dispensing therefore takes place, in the event that the numbers compared by the unit 34 do not correspond, or the checks on withdrawal-frequency and validity carried out by the units 27 and 28, are not satisfied. The customer is allowed to make up to three attempts with the one insertion of the card, to satisfy the correspondence check using the push-buttons 35. In normal circumstances the card is returned to the customer following the third unsuccessful attempt, but an overall limit is imposed on the total number of unsuccessful attempts at achieving correspondence that may be made successively at any time throughout the life of the card. To this end the word W3 read from the track T1 by the unit 21 represents the number of consecutive unsuccessful attempts in which the card has been involved since the last time the correspondence check was satisfied. Thus the card is returned to the customer if when the number represented by the word W3 read from the card 10 is taken into account, the prescribed overall limit of consecutive unsuccessful attempts is not reached. During such return the heads 24A and 24B of the unit 21 are appropriately energized to up-date the recorded word W3 as well as the word W2. If at any time however, the limit is reached, the card 10 is not returned but instead driven from the guideway 18 into a safe bin (not shown) for retention within the equipment.

The card is also driven to be retained within the equipment if the validity check carried out by the unit 28 is not satisfied, and also of course if the word W5 read from track T2 is before the current date set into the unit 27 by the device 29, that is to say, if the car 10 is indicated as having expired. If however, it is only the withdrawal-frequency check performed by the unit 27 that is not satisfied, in particular by virtue of the number represented by work W2 read from track T1 being zero, the card 10 is returned to the customer through the entrance 14.

Figure 5:
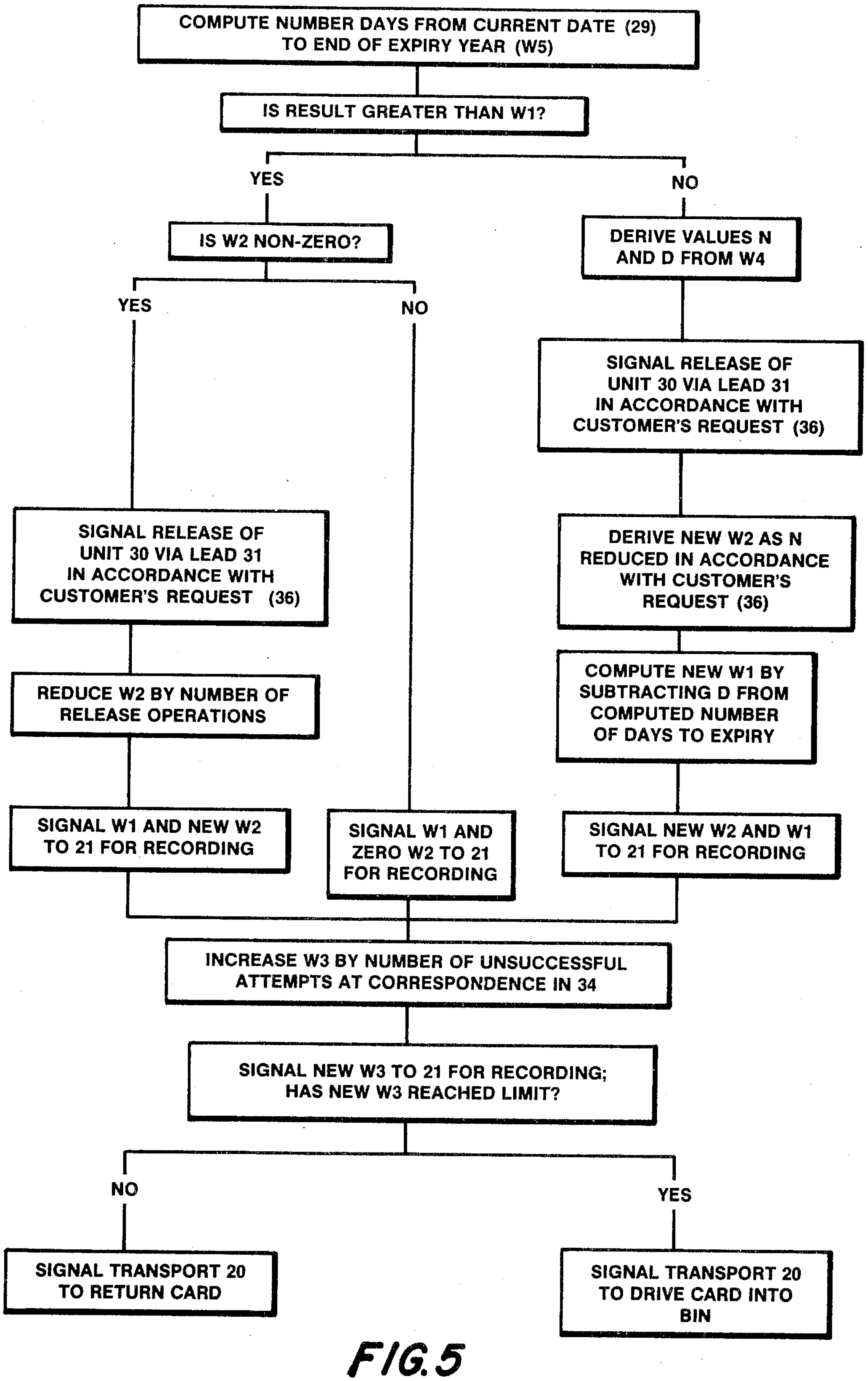
FIGS. 5 and 6 are flow charts illustrating program steps in the operation of two units of the system.

It has been assumed above that the date of commencement of the next withdrawal-frequency period represented on the card 10 by the word W1 and read from track T1 on insertion of the card into the equipment, is later than the current date. If this is not the case, and the number of days computed by the unit 27 to the end of the expiry year, is accordingly equal to or less than the number of days represented by the word W1, a new period of D days for frequency-of-use purposes has now begun. The operation of the unit 27 in these circumstances is to substitute the number N for the number represented by the word W2 read from track T1. The value of N appropriate for this is derived within the unit 27 in accordance with whichever of a plurality of possible frequency-of-use gradings applies to the customer. Identification of the customer's grading in this respect is carried by the card 10 in the word W4 recorded in track T1 and read from the card by the heads 25A and 25B. The word W4 may in this respect simply be a code that identifies which of a series of predetermined combinations of values of N and D held as stored information in the equipment, is to apply to use of the customer's card. The unit 27 is programmed, as illustrated in FIG. 5, to generate from the word W4 as conveyed to it from the unit 23, the values of N and D, defining the allowed maximum frequency-of-use, appropriate to the identified grading.

The value of D generated in the unit 27 from the word W4 in the circumstances under consideration, is utlized for the computation of the commencement of the next frequency-of-use period. In this respect the commencement of the next frequency-of-use period is to be D days after the current date set into the unit 27 by the device 29. The unit 27 accordingly acts to derive an appropriate number for substitution for the out-of-date number represented by the word W1 read from the card 10. As described above, the unit 27 already computes the number of days from the current date to the end of the expiry year represented by word W5 read from the card 10, and this number after reduction by the value of D is therefore appropriate for the up-dating of the word W1. Up-dating of the recording of word W1 in track T1 is carried out by appropriate energization of the heads 24A and 24B by the unit 21 as the card 10 is returned along the guideway 18. The word W2 recorded on the card is also up-dated at the same time to the value N or, depending on whether dispensing has taken place, to some lesser value in accordance with the number of packets dispensed.

Thus, as described above, the status of the card 10 as regards the frequency-of-use requirement defined by word W4, is embodied in the two recorded words W1 and W2 in a manner that readily allows for any appropriate updating with passage of time and use of the card. In particular, when the card is used the word W1 recorded on the card and representative of the commencement of the next period of full-use remains unmodified unless the new period has by then been entered. It is only in the circumstances that the represented new period has been entered that up-dating of the word W1 takes place, such up-dating then being made from the current date set in by the device 29, so as to preserve full availability within the frequency-of-use limitation.

The method of representing the commencement of the next frequency-of-use period as the number of days to the end of the expiry year is of advantage in relation to security, especially where cards are issued for one year only. More particularly, any fraudulent attempt to prolong the life of the card by modification of the year of expiry represented in the word W5, will in general have the effect of inhibiting use of the card (apart from any use already available as represented by the word W2) for the interval of time by which the expiry date has been changed. Until this interval of time has passed, commencement of a new frequency-of-use period (defined in relation to the expiry year of the recorded word W5, by the word W1 recorded on the 'secure' track T1) cannot occur. Any attempt on the other hand to achieve early commencement of a new frequency-of-use period by advancing the expiry year will in general be fruitless in that it will lead to retention of the card as having expired.

The security in the above aspects can be increased by computing the number of days appropriate to word W1 to the end of the month of expiry, or alternatively by arranging that the life of each card is limited to the calendar year.

The 'use' and 'account' processing units 27 and 28 may be provided as specific units in the same installation as the card-reception unit 13 as shown. Their function may however be performed by a central computer or data processor that is common to a number of card-reception units and is in on-line communication with them. In the latter case, nonetheless, a processor having the function of the units 27 and 28 may be provided with each individual card-reception unit for back-up purposes in the event of a break in the on-line operation. Whatever the case, storage capability or other facility is also provided within the system to enable appropriate records of each transaction performed, to be produced for accounting purposes.

I claim:

1. In a system comprising, in combination, equipment for receiving a token, and a token for use with the equipment, said token bearing recorded information relating to the extent of previous use of the token within one of a succession of periods of time throughout each of which the token is authorized for limited use, and the recorded information also including time-identifying data, said equipment being adapted to receive said token and being operative to perform an operation in dependence upon said recorded information, said equipment including means for reading said recorded information from the token, means for providing reference signals defining a current epoch in time, means for comparing the time-identifying data read from the token with said reference signals, and means for updating the said informatiion recorded on the token in dependence both upon the said operation performed by the equipment and the result of the said comparison between the time-identifying data read from the token and the said reference signals, the improvement wherein the time-identifying data recorded on the token defines the commencement of the authorized-use period which is next to commence following the last use of the token, and the said equipment includes means for up-dating the record of said time-identifying data on the token when the result of said comparison signifies that the next period-commencement is not later than the current time identified by the reference signals.

2. A system according to claim 1 wherein said information recorded on the token includes further data defining the length of each said authorized-use period, and wherein the said up-dating means includes means operative to define the next-period commencement as following at an interval of time equal to said length after the current epoch defined by the said reference signals.

3. Equipment for performing a function in dependence upon a token presented thereto, which token bears changeable recorded data defining the remaining available use of the token within one of a succession of periods throughout each of which the token is authorized for use, said equipment comprising means for receiving the token presented to the equipment, means for reading the recorded data from the received token to derive time-identifying signals, said time-identifying signals defining the authorized-use period which is next to commence immediately following previous use of the token, means for supplying reference signals defining a current epoch in time, means for effecting a comparison between the time-identifying signals and said reference signals to provide a first signal when said current epoch in time is before the said next authorized-use period defined by said time-identifying signals and otherwise to provide a second signal, output means operable to perform said function, means for operating said output means in accordance with a condition for operation that depends at least in part upon whether the result of said comparison is said first or second signal, said operating means including means responsive to occurrence of said first signal for determining whether said function may be performed without exceeding said remaining available use, and means responsive to occurrence of said second signal to up-date the said data recorded on the token to define a fresh one of said periods commencing after said current epoch.

4. Equipment according to claim 3 including means for reading further data from the received token to define the length of each said authorized-use period, and wherein said up-dating means is operative to define the commencement of said fresh period as following at an interval of time equal to said length after the said current epoch defined by said reference signals.

5. Equipment according to claim 4 including means for reading from the received token information as to its date of expiry, and wherein said up-dating means is operative to record on the token a number computed in dependence upon the interval of days between the dates of said commencement and expiry.

6. The combination of a dispenser that is releasable to effect a dispensing operation, and equipment according to claim 5, said output means of said equipment being operable to release the dispenser in performance of said function.

7. Equipment for controlling use of a credit card or like token that bears a recording medium, whereby the token is to have a limited extent of authorized use within each of successive periods of time, the equipment comprising means for receiving the token, means for reading from the received token information recorded in said medium, means deriving from said information use-related signals and time-related signals, said use-related signals being indicative of the aggregate use of said token in one of said periods and said time-related signals being indicative of the commencement of the next of said periods following said one period, means for supplying reference signals indicative of a current epoch in time, means for comparing the time-related signals with said reference signals to provide a first signal when said current epoch in time is before the indicated commencement of the next of said periods and otherwise to provide a second signal, means for signifying a requested use of the token, processing means operative in a first mode in response to said first signal and operative in a second mode in response to said second signal, said processing means when operative in said first mode determining whether the sum of the said requested use and said aggregate use lies within the said authorized limit of use of the token and, if it is, to issue an approval signal and a total signal indicative of the value of said sum, and said processing means when operative in said second mode determining whether the said requested use lies within the said authorized limit and, if it is, to issue said approval signal and said total signal indicative in said second mode of the value of said requested use alone, approval means to manifest approval of the requested use in response to occurrence of said approval signal, means to change the recording of aggregate use of the token to the value indicated by said total signal, and means operative in response to occurrence of said second signal to up-date the recording of said commencement of the next said period to a point in time following said epoch.

8. Equipment according to claim 7 including means for reading further data from the received token to define the length of each said authorized-use period, and wherein said up-dating means is operative to define the next-period commencement as following at an interval of time equal to said period length after said current epoch defined by said reference signals.

9. Equipment according to claim 7 in combination with dispensing means releasable to perform a dispensing operation, and wherein said approval means is means for releasing the dispensing means in response to issue of said approval signal.

10. In a method for performing an operation in response to presentation of a token, which method is conditioned by information read from a recording borne by the token, the recorded information relating to the extent of previous use of the token within one of a succession of periods of time throughout each of which the token is authorized for limited use, and wherein said method includes the steps of reading date information frm the token, comparing the read date information with the current date, and updating the recorded information on the token in dependence upon the operation performed and the result of said comparison, the improvement wherein the date information recorded on the token defines the commencement of the authorized-use period which is next to commence followng the last use of the token, and the updating of the information recorded on the token occurs when the result of said comparison signifies that the next period-commencement is not later than the current date.

11. A method according to claim 10 wherein further data is read from the token and the commencement of the next authorized-use period is defined in the updating so as to follow the current date after an interval that is of a length determined from the said further data.

12. A method according to claim 11 wherein the further data read from the token defines the length of each of the said authorized-use periods, and the said interval is made equal to this.

13. A method according to claim 11 wherein the further data rread from the token defines the maximum extent of use of the token authorized for each authorized-use period, the method including the step of updating the recorded information relating to the extent of previous use of the token in accordance with the token-defined maximum whenever the date of commencement of the next authorized-use period is updated.

14. A method according to claim 10 including the step or reading from the token a record of the date of its expiry, and the step of recording on the token the date of commencement of the next authorized-useperiod as a number in accordance with the interval of days between the two dates.

15. A method according to claim 10 wherein said operation is dispensing of money in accordance with a request made by the token-holder.

16. A method for controlling a credit transaction by use of a credit card or like token that bears recorded information relating to a limited extent of authorized use of the token within each of a plurality of successive periods of time, said method comprising reading said recorded information from the token, deriving from said read information use-related signals and time-related signals, said use-related signals being indicative of the aggregate use of said token in one of said periods and said time-related signals being indicative of the commencement of the next of said periods following said one period, supplying reference signals indicative of a current epoch in time, comparing the time-related signals with said reference signals to provide a first signal when said current epoch in time is before the indicated commencement of the next of said periods and otherwise to provide a second signal, determining in response to occurrence of said first signal whether the sum of the said requested use and said aggregate use lies within the said authorized limit of use of the token, producing an approval signal and a total signal indicative of the value of said sum when said determination is affirmative, alternatively determining in response to occurrence of said second signal whether the said requested use lies within the said authorized limit, producing said approval signal and said total signal indicative of said requested use alone when said alternative determination is affirmative, manifesting approval of the requested use in response to occurrence of said approval signal, changing the recording of aggregate use on the token to the value indicated by said total signal, and up-dating the recording of said commencement of the next said period to a point in time following said epoch in response to occurrence of said second signal.

17. The method of claim 16 wherein said reading step reads further data from the token to define the length of each said authorized-use period, and said up-dating step defines the next-period commencement as following at an interval of time equal to said period length after the current epoch defines by the said reference signals.

18. The method of claim 16 including the step of performing a dispensing operation in response to occurrence of said approval signal.

* * * * *